Patented June 13, 1933

1,914,335

UNITED STATES PATENT OFFICE

CARL WINTER AND NIKOLAUS ROH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PURIFICATION OF ANHYDROUS ALUMINIUM CHLORIDE CONTAINING IRON

No Drawing. Application filed April 13, 1931, Serial No. 529,808, and in Germany April 19, 1930.

The present invention relates to the purification of anhydrous aluminium chloride containing iron.

It has already been proposed to remove the iron from anhydrous aluminium chloride containing iron by converting the aluminium chloride into a liquid aluminium chloride phosgene compound by means of phosgene, separating it from the undissolved ferric chloride and recovering aluminium chloride free from iron by evaporating off the phosgene. By this treatment, however, it is not always possible to produce aluminium chloride free from iron compounds.

We have now found that practically pure aluminium chloride, in particular free from iron compounds, is obtained when during or after the phosgene treatment, but before decomposition of the double compound, the material to be purified is subjected to a treatment with oxidizing agents, such as the halogens chlorine and bromine, preferably by leading in chlorine, in order to convert the iron into the trivalent form, which is insoluble in phosgene. The undissolved ferric chloride is then separated from the aluminium chloride phosgene double compound and the aluminium chloride recovered by evaporating the phosgene. A substantially complete separation of aluminium chloride and iron chloride is effected by reducing the ferric chloride to ferrous chloride prior to or while acting on the initial material with phosgene. The aluminium chloride is thus completely dissolved together with the ferrous chloride, the iron being then precipitated in the form of ferric chloride by oxidation. It has been found that the aluminium chloride containing iron chloride obtained for example from bauxite can only be incompletely brought into solution by treatment with phosgene. A considerable residue (up to 25 per cent) remains behind which in addition to ferric chloride contains mainly aluminium chloride and which probably consists of a complex salt of aluminium chloride and iron chloride which is insoluble in phosgene. When the ferric chloride present is, however, first reduced to ferrous chloride, as for example by the addition of aluminium or heavy metals such as iron, tin, zinc, nickel or cobalt, or by means of hydrogen or stannous chloride, it is possible to bring the aluminium chloride completely into solution and to recover it in a form free from iron by precipitating the whole of the iron by oxidation to ferric chloride, separating the latter and decomposing the purified liquid double compound. In some cases the theoretical amount of oxidizing agent necessary to convert the divalent iron present into trivalent iron is sufficient for the oxidation, but as a rule an excess of from 10 to 20 per cent is preferable.

The following examples will further illustrate how the said invention may be carried out in practice, but the invention is not restricted to these examples. The parts are by weight.

Example 1

4000 parts of crude aluminium chloride containing 1 per cent of ferrous chloride and from 5 to 6 per cent of ferric chloride are stirred for 15 hours in an enamelled pressure vessel with 6000 parts of liquid phosgene and 15 parts of chlorine at 60° C. under a pressure of from 3 to 4 atmospheres, and after cooling, the whole is pressed into a settling vessel at ordinary temperature. By siphoning off, a clear aluminium chloride-phosgene double compound practically free from iron is obtained which may be decomposed into its components in the usual manner. Phosgene gas may also be employed instead of liquid phosgene. In this case the phosgene gas is led from the bottom into towers filled with crude aluminium chloride. The iron is then precipitated from the effluent aluminium chloride phosgene compound by leading in chlorine. The iron is separated off. Pure aluminium chloride is obtained as a residue by heating the liquid.

Example 2

4000 parts of crude aluminium chloride containing from 5 to 6 per cent of ferric chloride and 20 parts of coarse aluminium powder are dissolved during the course of about 15 hours in 6000 parts of liquid phosgene while stirring at 60° C. under a pressure of from 3 to 4 atmospheres. The ferric chloride is reduced to ferrous chloride and the aluminium chloride is thus completely dissolved, together with the ferrous chloride. In order to precipitate the iron, 100 parts of chlorine (about 25 per cent excess) are led in and the whole is stirred for a short time. After cooling to 15° C., the separated iron chloride is allowed to settle. After removing it, 9800 parts of an aluminium chloride phosgene double compound practically free from iron are obtained. The aluminium chloride obtained by distilling off the phosgene contains only 0.062 per cent of ferric chloride.

If, in the process described in the first paragraph of this example, no coarse aluminium powder is added as a reducing agent, only 6200 parts of clear, iron-free phosgene double compound are obtained after sedimentation and siphoning off. In the residual sludge there are still 720 parts of aluminium chloride and 180 parts of ferric chloride.

What we claim is:—

1. A process for the purification of anhydrous aluminium chloride containing iron compounds which comprises acting on the aluminium chloride with phosgene converting thereby the aluminium chloride into a liquid double compound, acting on the said double compound with an oxidizing agent, separating said compound from undissolved iron compounds and recovering aluminium chloride by evaporating off the phosgene.

2. A process for the purification of anhydrous aluminium chloride containing iron compounds which comprises acting on the aluminium chloride with phosgene converting thereby the aluminium chloride into a liquid double compound, acting on the said double compound with chlorine, separating said compound from undissolved iron compounds and recovering aluminium chloride by evaporating off the phosgene.

3. A process for the purification of anhydrous aluminium chloride containing iron compounds comprising ferric chloride which comprises reducing the ferric chloride present to ferrous chloride acting on the aluminium chloride with phosgene, converting thereby the aluminium chloride into a liquid double compound, acting on the said double compound with an oxidizing agent, separating the said liquid double compound from undissolved iron compounds and recovering aluminium chloride by evaporating off the phosgene.

4. A process for the purification of anhydrous aluminium chloride containing iron compounds comprising ferric chloride which comprises reducing the ferric chloride present to ferrous chloride by the addition of a metal capable of reducing ferric chloride to ferrous chloride, acting on the aluminium chloride with phosgene, converting thereby the aluminium chloride into a liquid double compound, acting on the double compound with an oxidizing agent, separating the said liquid double compound from undissolved iron compounds and recovering aluminium chloride by evaporating off the phosgene.

5. A process for the purification of anhydrous aluminium chloride containing iron compounds comprising ferric chloride which comprises reducing the ferric chloride present to ferrous chloride by the addition of aluminium, acting on the aluminium chloride with phosgene, converting thereby the aluminium chloride into a liquid double compound, acting on the double compound with an oxidizing agent, separating the said liquid double compound from undissolved iron compounds and recovering aluminium chloride by evaporating off the phosgene.

6. A process for the purification of anhydrous aluminium chloride containing iron compounds comprising ferric chloride which comprises reducing the ferric chloride present to ferrous chloride by the addition of aluminium, acting on the aluminium chloride with phosgene, converting thereby the aluminium chloride into a liquid double compound, acting on the said double compound with chlorine, separating the said compound from undissolved iron compounds and recovering aluminium chloride by evaporating off the phosgene.

In testimony whereof we have hereunto set our hands.

CARL WINTER.
NIKOLAUS ROH.